US012725981B2

(12) United States Patent
Holub

(10) Patent No.: US 12,725,981 B2
(45) Date of Patent: Sep. 1, 2026

(54) DETACHABLE HEADER HOUSING FOR A HEADER CONNECTOR ASSEMBLY, AND METHOD FOR DISASSEMBLING OR ASSEMBLING THEREOF

(71) Applicant: J.S.T. CORPORATION, Farmington Hills, MI (US)

(72) Inventor: Franklin A. Holub, West Bloomfield, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 503 days.

(21) Appl. No.: 18/082,488

(22) Filed: Dec. 15, 2022

(65) Prior Publication Data

US 2023/0246391 A1 Aug. 3, 2023

Related U.S. Application Data

(60) Provisional application No. 63/425,201, filed on Nov. 14, 2022, provisional application No. 63/304,517, filed on Jan. 28, 2022.

(51) Int. Cl.
*H01R 13/6581* (2011.01)
*H01R 13/506* (2006.01)
(Continued)

(52) U.S. Cl.
CPC ....... *H01R 13/6581* (2013.01); *H01R 13/506* (2013.01); *H01R 13/512* (2013.01);
(Continued)

(58) Field of Classification Search
CPC .............. H01R 13/6581; H01R 13/506; H01R 13/512; H01R 13/516; H01R 13/748;
(Continued)

(56) References Cited

U.S. PATENT DOCUMENTS 5,362,261 A 11/1994 Puerner
9,742,081 B1 * 8/2017 Annis ................ H01R 12/7082
(Continued)

FOREIGN PATENT DOCUMENTS

CN 105226430 A 1/2016
WO 2012/050628 A1 4/2012

OTHER PUBLICATIONS

International Search Report for International Application No. PCT/US2022/030575 dated Aug. 24, 2022 (3 sheets).
(Continued)

*Primary Examiner* — Justin M Kratt
(74) *Attorney, Agent, or Firm* — Kratz, Quintos & Hanson, LLP

(57) ABSTRACT

A shielded sealed header connector assembly having a detachable header housing, which is comprised of a outer shell and a metal shield member, and inner housing. The header housing is secured on a metal case with bolts and attached with an inner housing. The metal shield member, shields or seals the inner housing from EMI, external damage, either due to physical impact or from environmental contaminants. A method for detaching the header housing includes steps of unsecuring the header housing from the metal case by removing bolts and unlocking it from the inner housing while the inner housing maintains connection to a electrical device. A method for attaching a serviced, repaired, replaced or new header housing includes steps of attaching the header connector to the metal case with bolts; and locking the header connector to the inner housing, while maintaining the connection of the inner housing to the electrical device.

18 Claims, 9 Drawing Sheets

(51) Int. Cl.

| | |
|---|---|
| ***H01R 13/512*** | (2006.01) |
| ***H01R 13/516*** | (2006.01) |
| ***H01R 13/74*** | (2006.01) |
| ***H01R 43/00*** | (2006.01) |
| *H01R 13/502* | (2006.01) |
| *H01R 13/514* | (2006.01) |
| *H01R 13/6591* | (2011.01) |
| *H01R 13/6596* | (2011.01) |
| *H01R 13/73* | (2006.01) |

(52) U.S. Cl.

CPC ........... *H01R 13/516* (2013.01); *H01R 13/74* (2013.01); *H01R 13/748* (2013.01); *H01R 43/002* (2013.01); *H01R 13/502* (2013.01); *H01R 13/514* (2013.01); *H01R 13/6591* (2013.01); *H01R 13/6596* (2013.01); *H01R 13/73* (2013.01); *H01R 43/005* (2013.01); *H01R 2201/26* (2013.01)

(58) Field of Classification Search

CPC .. H01R 43/002; H01R 13/502; H01R 13/514; H01R 13/6591; H01R 13/6596; H01R 13/73; H01R 13/74; H01R 43/005; H01R 2201/26

See application file for complete search history.

(56) References Cited

U.S. PATENT DOCUMENTS

| | | | | |
|---|---|---|---|---|
| 2014/0106619 | A1* | 4/2014 | Okamoto | H01R 13/6596 439/607.58 |
| 2018/0034171 | A1 | 2/2018 | Tyler | |
| 2021/0175672 | A1 | 6/2021 | Hitchcock | |
| 2021/0340894 | A1* | 11/2021 | Neumann | F01N 3/2013 |
| 2022/0337007 | A1* | 10/2022 | Chen | H01R 13/6315 |

OTHER PUBLICATIONS

Co-Pending U.S. Appl. No. 17/749,960, filed May 20, 2022.

International Search Report for International Application No. PCT/US2022/53556 dated Apr. 12, 2023 (2 sheets).

* cited by examiner

DETACHABLE HEADER HOUSING FOR A HEADER CONNECTOR ASSEMBLY, AND METHOD FOR DISASSEMBLING OR ASSEMBLING THEREOF

CROSS-REFERENCE TO RELATED APPLICATIONS

This patent application claims priority to U.S. Provisional Patent Application No. 63/425,201 filed Nov. 14, 2022, and further claims priority to U.S. Provisional Patent Application No. 63/304,517 filed Jan. 28, 2022, which are both hereby incorporated herein by reference in their entireties.

BACKGROUND OF THE INVENTION

It is desired that a shielded sealed header connector assembly, which comprises a header housing, a metal shield member, inserted therein, and an inner housing. The header housing is comprised of an outer shell having an upper shell body and a base member. The outer shell is mounted onto a metal case when in operational use with the inner housing. The header housing is mounted and locked with the inner housing which is inserted into the header housing. The inner housing, may hold at least one metal contact or pin spaced apart at specific spacings. The inner housing and/or the header housing, may be connected to an electrical component (such as, a main body containing terminals, a power assembly, a high voltage and interlock loop (HVIL) assembly, or the like), which may in turn be connected or attached to an electrically emitting device.

In order to aid in the protection of the inner housing from external damage, when in use, the header housing, encapsulates and/or surrounds a portion of the inner housing which extends above the metal case and into the outer shell; protecting the inner housing from external damage either due to external physical impact, external environmental contaminants, or other adverse external harms that affect the satisfactory performance and/or usability of the header connector assembly. Additionally, the metal shield member shields the inner housing from EMI (electric or magnetic field interference), electrical emission or generation forces, as well as other electromagnetic spectrum or the like. The metal shield also has tabs which contact the metal case, for grounding purposes, aiding in the performance or effect of the shield member, and may also be part of a grounding scheme if required.

Further, the header housing is fixed or secured to the metal case with bolts, providing solid fixation and contact of the base member of the outer shell to the metal case. The fixation or securing of the header housing to the metal case, secures the outer shell to the metal case, and allows for the protection and sealing of the inner housing as well.

Additionally, during, for example, transport or some other occasion, if the outer shell becomes damaged due to adverse effects, for example, physical impact, or becomes generally unusable, for example, unable to protect the inner housing (unable to seal, or shield), it is essential that the header housing, outer shell with metal shield member, be serviced or replaced to restore the satisfactory performance and/or usability of the header housing in the header connector assembly.

When it becomes necessary for the header housing, outer shell containing the shield member, to be serviced or replaced due to physical damage or due to its inability to protect (i.e., by shielding or sealing) the inner housing, it is important and essential that the header housing, be readily and efficiently unlocked, disassembled, detached, or removed from the inner housing. That is, it is important that a method be made available to unlock, disassemble, detach, or remove a damaged or unusable header housing, from the inner housing, and that such unlocking, detaching, disassembling, or removing of the the header housing from the inner housing be readily, easily and efficiently made. That is, it is important that the damaged or unusable header housing be detached from the metal case, and readily and efficiently unlocked, disassembled, detached or removed from the inner housing, and to be serviced or replaced by a user.

When a header housing is unsecured from the metal case and, unlocked, disassembled, detached, or removed from the inner housing, for service or repair by a user, it is also important that the inner housing remains connected to its associated or corresponding electrical component and remains inserted into an aperture of the metal case.

It is similarly important that, once the header housing is unlocked, disassembled, detached, or removed for replacement or service, a method be made available for reassembly with a repaired header housing (containing a shield member) or a new header housing (containing a new shield member) to be readily and efficiently secured, attached, assembled, or mounted onto the metal case with installation of the bolts, as well as locked, attached, and assembled with the inner housing.

When a repaired or replaced header housing, is locked, attached and assembled with the inner housing, it is also important that the inner housing remains connected to its associated or corresponding electrical component and remains inserted into the aperture of the metal case.

SUMMARY OF THE INVENTION

This invention is directed to a shielded sealed "header" connector assembly, which comprises a header connector, a metal shield member, inserted therein, and an inner housing, and method for disassembling or assembling thereof. The header connector of this invention is preferably comprised of an outer shell having the metal shield member inserted therein. The outer shell of the header housing protects the inner housing that is connected to an electrical device (such as, a main body containing terminals, a power assembly, a high voltage and interlock loop (HVIL) assembly, or the like). The header housing is mounted onto the metal case with bolts, and locked with the inner housing. The inner housing of this invention, may hold at least one metal contact or pin spaced apart at specific spacings, and may also have have terminals and bus bars attached. The inner housing preferably remains connected to an associated or corresponding electrical device. The header housing of this invention, which is comprised of the outer shell with the metal shield member, shields or seals the inner housing from external damage, either due to physical impact or from environmental contaminants. The metal shield member, also protects the inner housing from EMI (electric or magnetic field interference), electrical emission or generation forces, as well as other electromagnetic spectrum or the like. The metal shield member also has tabs which contact the metal case for grounding purposes and for shielding performance. During, for example, transport or some other occasion, the detachable header housing, in this invention, may become damaged or unable to, generally, protect the inner housing. The detachable header housing, containing the outer shell with the shield member, of this invention is required to be readily serviced or replaced. That is, in this invention, when a user finds it or it becomes necessary for the header housing, the outer shell with the shield member, to be serviced or replaced due to physical damage or due to the inability to protect (i.e., by shielding or sealing) the inner housing, of this invention is readily and efficiently detached, disassembled, or removed from the metal case and unlocked from the inner housing. This invention is further directed to a method to unlock, detach, disassemble, or remove a damaged header housing, from the inner housing. The header housing and inner housing each having a latch member which disengages from the other, unlocking the header housing. Such method of this invention of detaching, disassembling, or removing of the damaged header housing of the header connector assembly is easily and efficiently made. That is, the header housing of this invention, when damaged or unusable, is readily and efficiently detached, disassembled, or removed from the metal case and unlocked from the inner housing, and to be serviced or replaced by a user, for example, by using a screwdriver or tool.

Furthermore, in this invention, when the header housing of this invention is detached, disassembled, or removed from the inner housing, for service or repair, the inner housing remains connected to its associated or corresponding electrical device and within an aperture of the metal case.

Moreover, in this invention, once detached, disassembled, or removed for replacement or service, a repaired header housing in this invention (containing a repaired outer shell with shield member) or a new header housing in this invention (containing a new outer shell with shield member) is readily and efficiently attached, assembled, or mounted back onto the metal case with the bolts, and locked with the inner housing of the header connector assembly.

Furthermore, in this invention, when the repaired or replaced header housing of the header connector assembly is attached, assembled, or mounted back onto the inner housing and locked with the inner housing, the inner housing remains connected to its associated or corresponding electrical device.

DETAILED DESCRIPTION OF THE PREFERRED EMBODIMENTS

Figure 1:
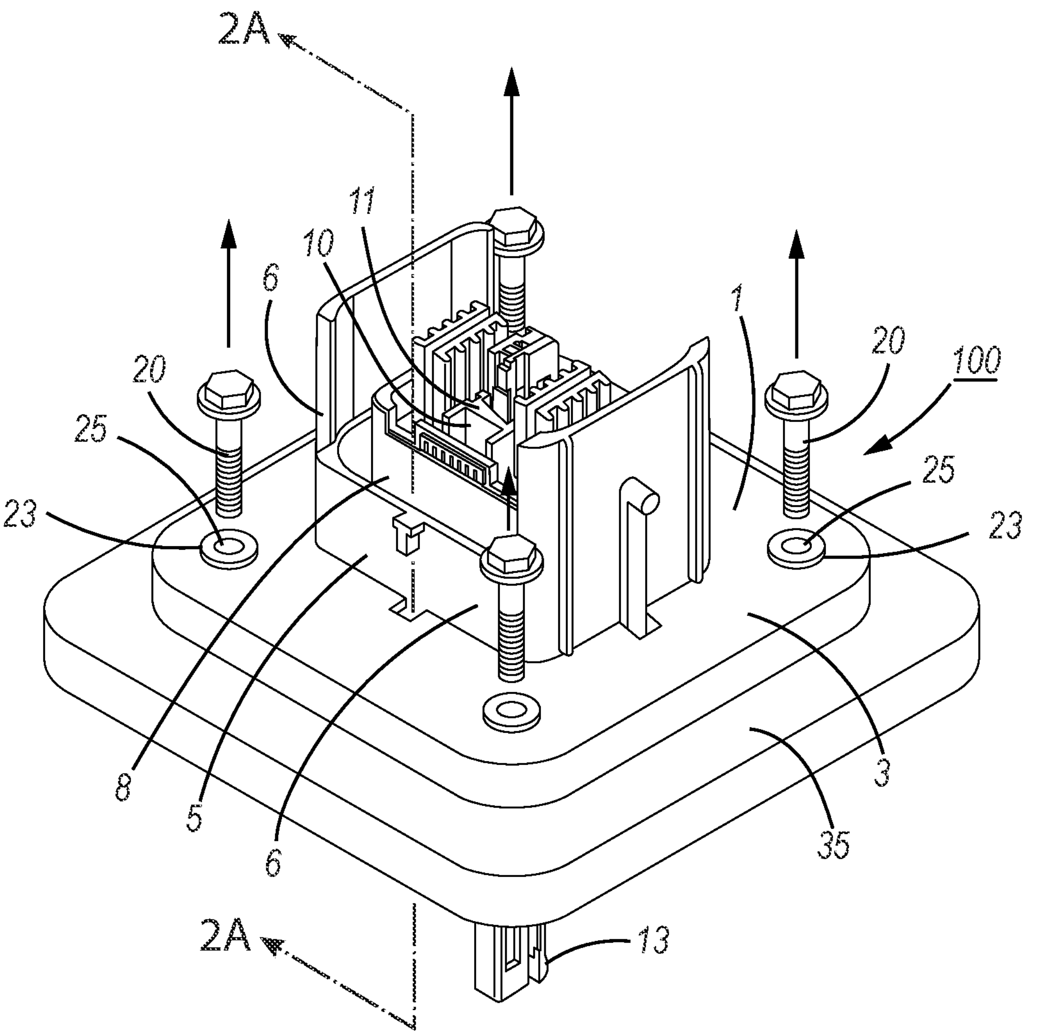
FIG. 1 is a perspective view of the detachable header connector of this invention for the header connector assembly, the header connector being in a position to be detached, disassembled, or removed from the metal case and the inner housing that in turn preferably remains connected to a electrical device.

FIG. 1 illustrates a fully assembled shielded sealed header connector assembly, generally referred to as reference number 100, of this invention. The shielded sealed header connector assembly 100 is comprised of a header housing 1, a metal shield member 8, and an inner housing 10.

The header housing 1 is comprised of an outer shell 5 and the metal shield member 8. The outer shell 5 is an integrally formed, integrally molded, and non-welded construction, the outer shell 5 being comprised of an upper shell body 6, and a base member 3. The header housing 1 has the metal shield member 8, which is inserted or integrally molded within the outer shell 5. That is, the metal shield member 8 is inserted and/or integrally molded and secured within and into the outer shell 5. The inner housing 10 of the header connector assembly 100 is also an integrally formed, integrally molded, and non-welded construction. The inner housing 10 resides within the header housing 1, within the outer shell 5, and within the metal shield member 8, when the connector assembly 100 is fully assembled. Therefore, the metal shield member 8 is provided to surround and shield a portion of the inner housing 10 that is within the header housing 1, and outer shell 5.

Figure 6:
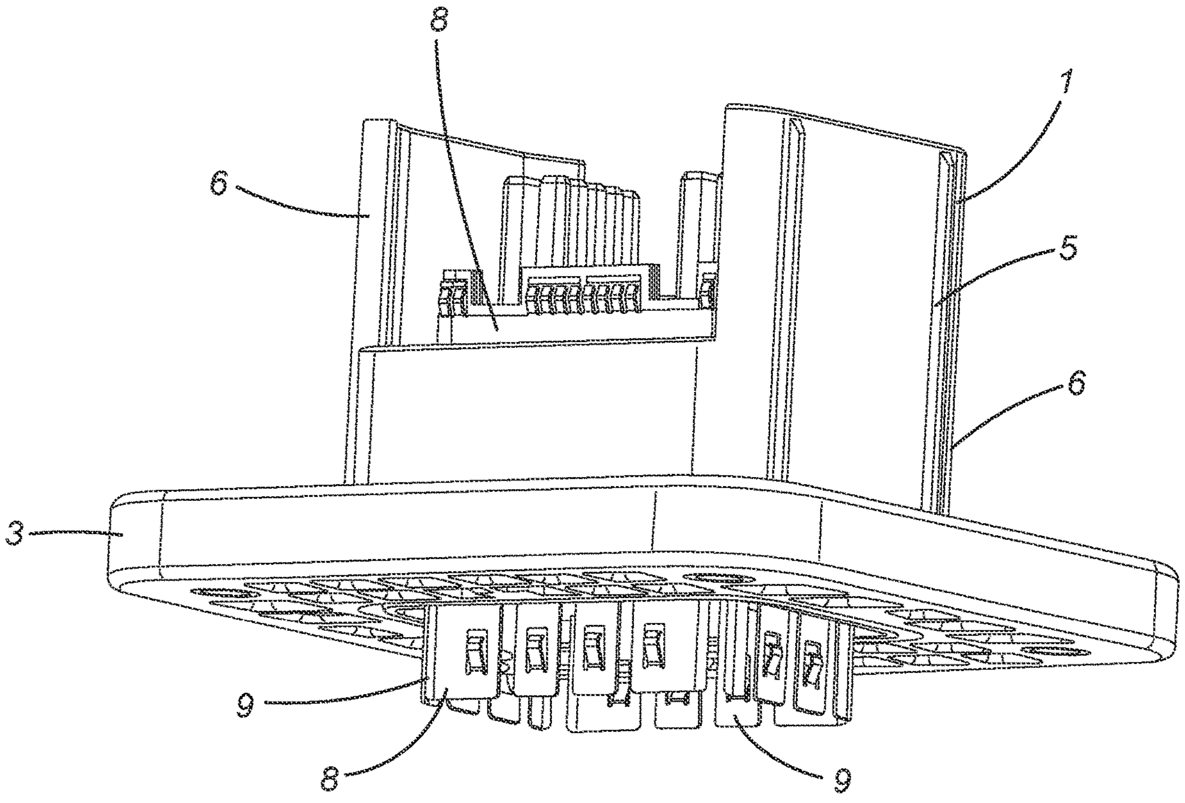
FIG. 6 is a perspective view showing the header housing of this invention with the metal shield member having tabs.

The metal shield member 8 also has tabs 9 for effective grounding of the shield. The tabs 9 protrude from a bottom end of the outer shell 5, and contact the metal case 35, and may be within an aperture 37 of the metal case 35, when the header housing 1 is mounted to the metal case 35 (See FIGS. 2A and 6). The tabs 9 contact with the metal case 35, thereby providing a grounding scheme or grounding component for the metal shield member 8. The grounding of the tabs 9 aid in the shielding performance or effect of the metal shield member 8. The metal shield member 8 provides shielding of the inner housing 10 from EMI (electromagnetic interference), electrical emission or generation forces, as well as other electromagnetic spectrum or the like. The top end of the metal shield member 8 may also accommodate or operate in a further grounding scheme, if so desired, when another connector housing (not shown), having a shielding or grounding means, is provided or connected to the header housing 1, outer shell 5 and metal shield member 8.

Figure 7:
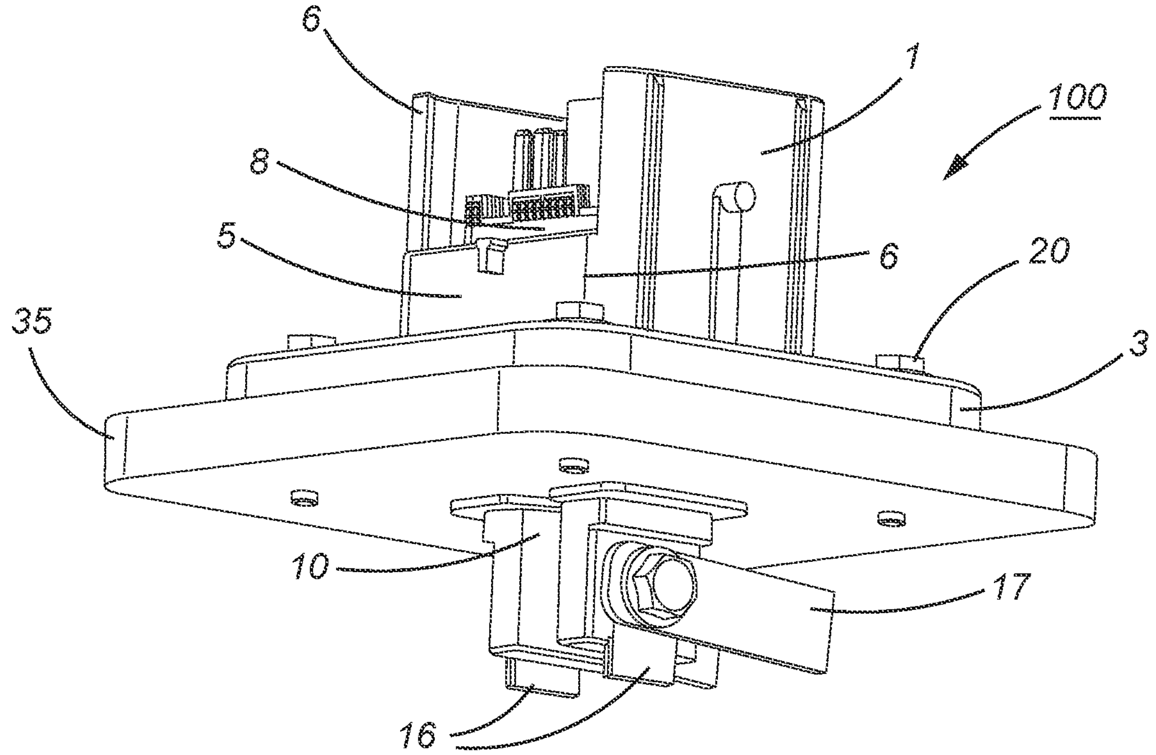
FIG. 7 is a perspective view of a fully assembled header connector assembly, showing the header housing of this invention with the inner housing inserted and the inner housing having terminals and bus bar installed therein.

The inner housing 10 holds at least one metal contact or pin spaced apart at specific spacings (not shown) on a top end portion 11, and additionally has a bus bar(s) 17 and terminals 16 at a bottom end portion 14 which extends below the metal case 35 (as seen in FIG. 7). Additionally, the inner housing 10 resides in and through an aperture 37 in the metal case 35.

The header housing 1, having the base member 3, is effectively secured on the top of the metal case 35 with bolts 20 and is locked with the inner housing 10 when the shielded sealed header connector assembly 100 is fully assembled for use. The upper shell body 6, of the outer shell 5, protects the sides of a top portion of the inner housing 10 (the portion of the inner housing 10 above the metal case 35 and within the upper shell body 6). Similarly, the metal shield member 8 of the header housing 1, protects the sides of a top portion of the inner housing 10 (the portion of the inner housing 10 above the metal case 35 within the outer shell 5). The inner housing 10 may be connected to an electrical component (not shown) on its top end 11 (such as, a main body containing terminals, a power assembly, a high voltage and interlock loop (HVIL) assembly, or the like), which may in turn be connected to an electrical device (not shown). Similarly, the inner housing 10 may be connected to an electrical component 13 on its bottom end 14 (such as, a main body containing terminals, a power assembly, a high voltage and interlock loop (HVIL) assembly, or the like) and may in turn be connected to an electrical device (not shown).

Figure 2A:
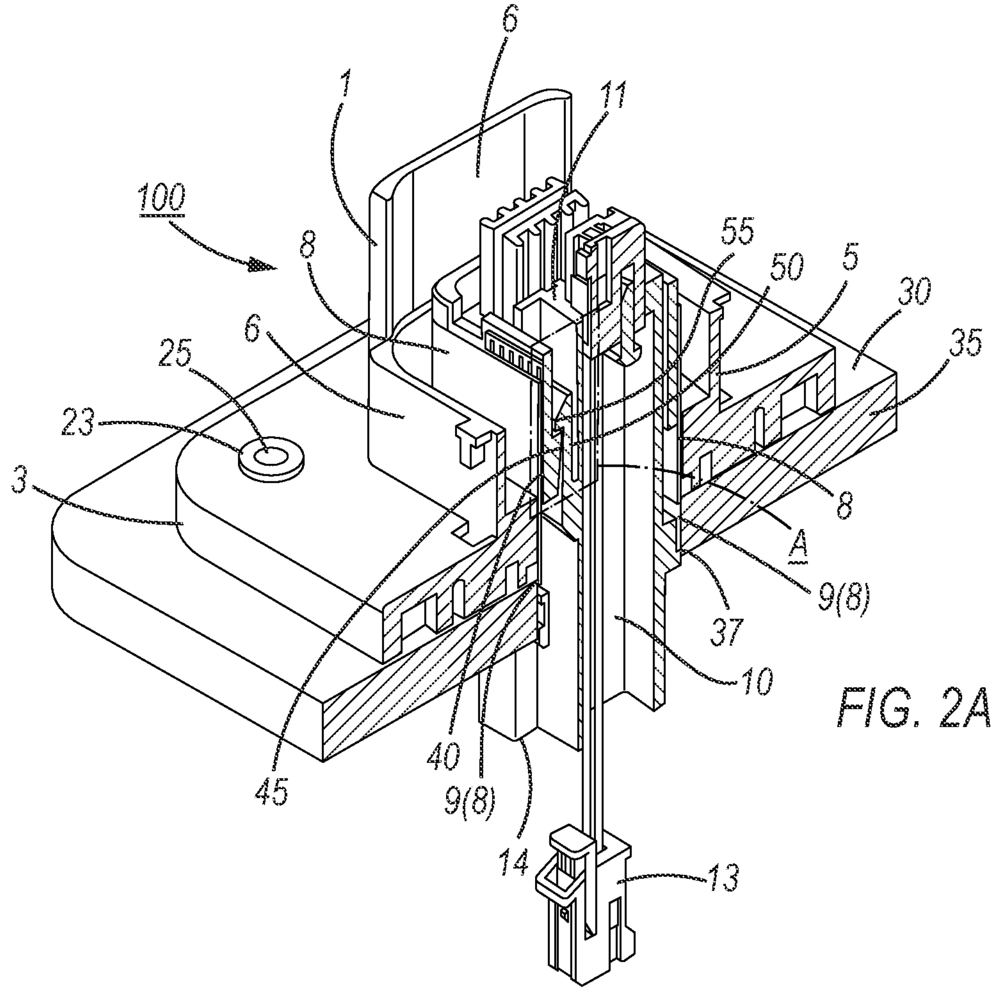
FIG. 2A is a cross-sectional view, taken along line 2A-2A of FIG. 1, showing the structural arrangement or manner for allowing the detachable header housing of this invention to be readily and efficiently detached, disassembled, or removed from the metal case and the inner housing that in turn preferably remains connected to the electrical device.

FIG. 1 is a perspective view of the header housing 1 of this invention, the outer shell 5 of this invention having the inner housing 10 within the header housing 1 and the outer shell 5, and firstly being, unsecured from the metal case 35 by loosening and removing the securing bolts 20, and secondly being readily and efficiently removed form the metal case 35 by becoming unlocked, detached, disassembled, or removed from the inner housing 10 (see FIG. 2A). It is preferable that the inner housing 10 remains connected to the electrical component 13.

In the header housing 1 of this invention, with the outer shell 5 and the metal shield member 8, shields and seals the inner housing 10 from external damage either due to external physical impact, external environmental contaminants, or other adverse external harms that affect the satisfactory performance and/or usability of the header connector assembly 100. During, for example, transport or some other occasion, the header housing 1 of this invention may become damaged due to physical impact, or becomes generally unusable, for example, unable to protect the inner housing 10 (unable to seal, or shield), the header housing 1 of this invention can be readily and efficiently serviced or replaced. That is, when it becomes necessary for the header housing 1 of this invention, outer shell 5 with the metal shield member 8, to be serviced or replaced due to physical damage or due to its inability to protect (i.e., by shielding or sealing) the inner housing 10, it is important and essential that the header housing 1, can be readily and efficiently unlocked, disassembled, detached or removed from the inner housing 10, while, preferably, the inner housing 10 remains attached to its associated or corresponding electrical device 13.

As further illustrated in FIG. 1, in the event that the header housing 1, with the metal shield member 8 of this invention, becomes damaged or requires servicing or repair, the damaged header housing 1, with the outer shell 5 and the metal shield member 8, can be readily and efficiently disassembled, detached, or removed from the metal case 35 by unscrewing and removing bolts 20 screwed into the metal case 35, each of the bolts 20 passing through a corresponding one of metallic compression limiters 23, each metallic compression limiter 23 being fitted in a respective one of apertures 25 of a base member 3 of the outer shell 5. The header housing 1 of this invention, with the outer shell 5, is thus, unsecured from the metal case 35; that is, it is no longer secured to the metal case 35 by the bolts 20.

FIG. 2A is a cross-sectional elevational view, taken along a dashed-lined closed-up portion A shown in FIG. 2A, more particularly showing the structural arrangement or manner for allowing the detachable header housing 1 of this invention to be readily and efficiently unlocked, detached, disassembled, or removed from the inner housing 10 that preferably remains connected to the associated or corresponding electrical device 13. As more particularly shown in the dashed-lined closed-up portion A in FIG. 2A, the header housing 1, with the outer shell 5, includes a latch member 40 having an engaging portion 45 extending inward of the outer shell 5, while the inner housing 10 includes another latch member 50 having an engaging portion 55 extending outward of the inner housing 10.

Figure 2B:
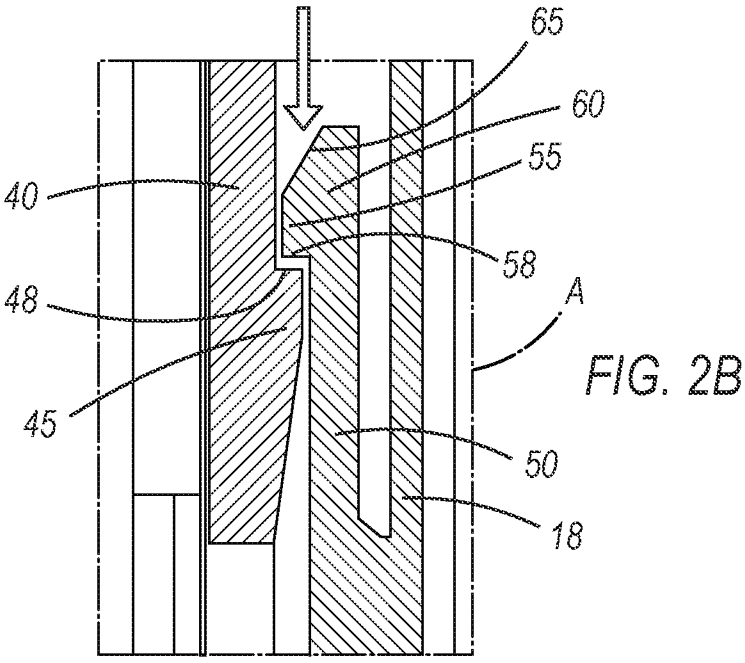
FIG. 2B is a cross-sectional elevational view, taken along a dashed-lined rectangular closed-up portion A shown in FIG. 2A, more particularly showing the structural arrangement or manner for allowing the detachable header housing of this invention to be readily and efficiently detached, disassembled, or removed from the metal case and inner housing that in turn preferably remains connected to the electrical device.
Figure 3:
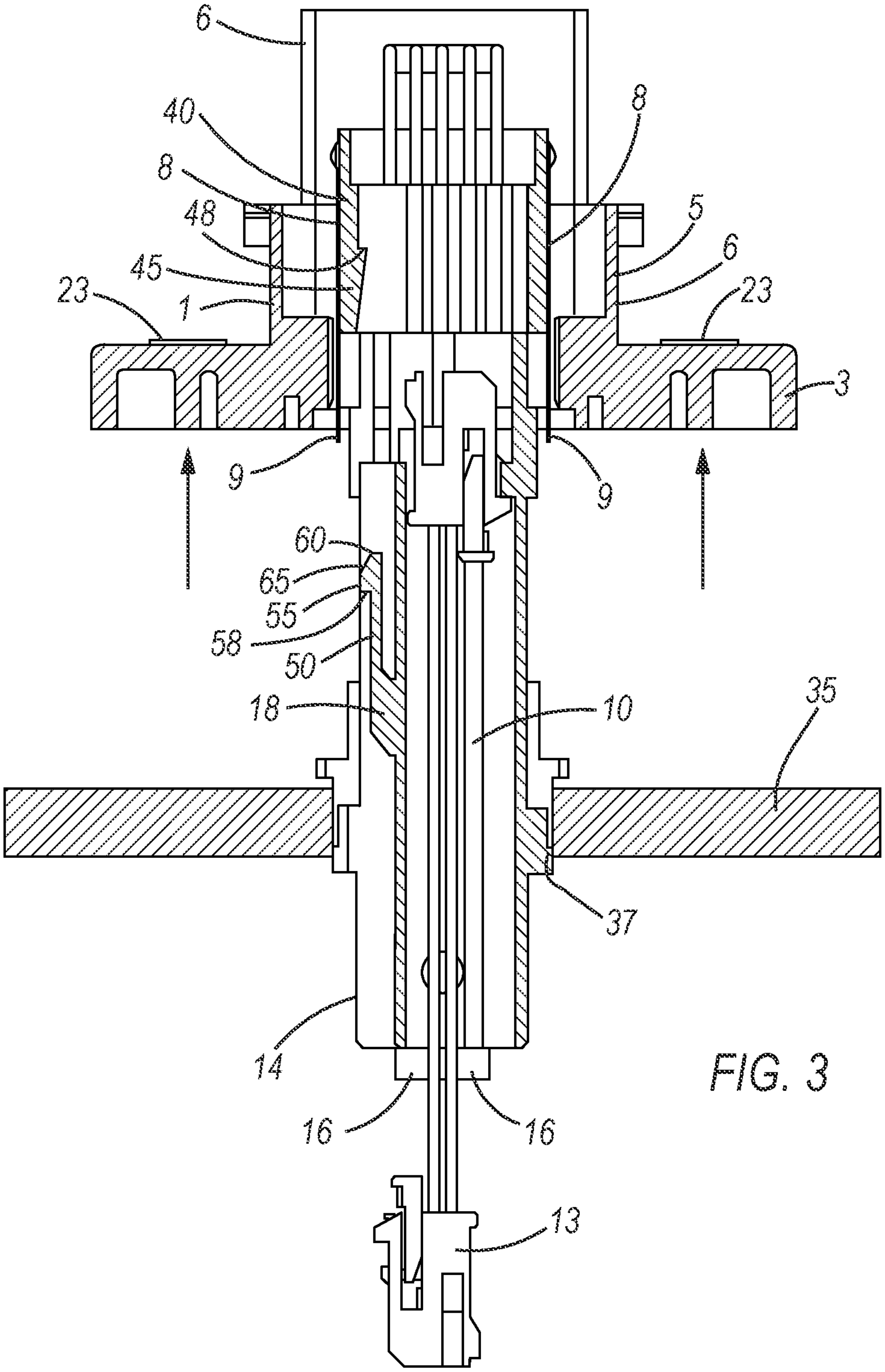
FIG. 3 is a cross-sectional elevational view showing the structural arrangement or manner in which the detachable header housing of this invention for the header connector assembly is detached, disassembled, or removed from the metal case and inner housing that in turn preferably remains connected to the electrical device.
Figure 4:
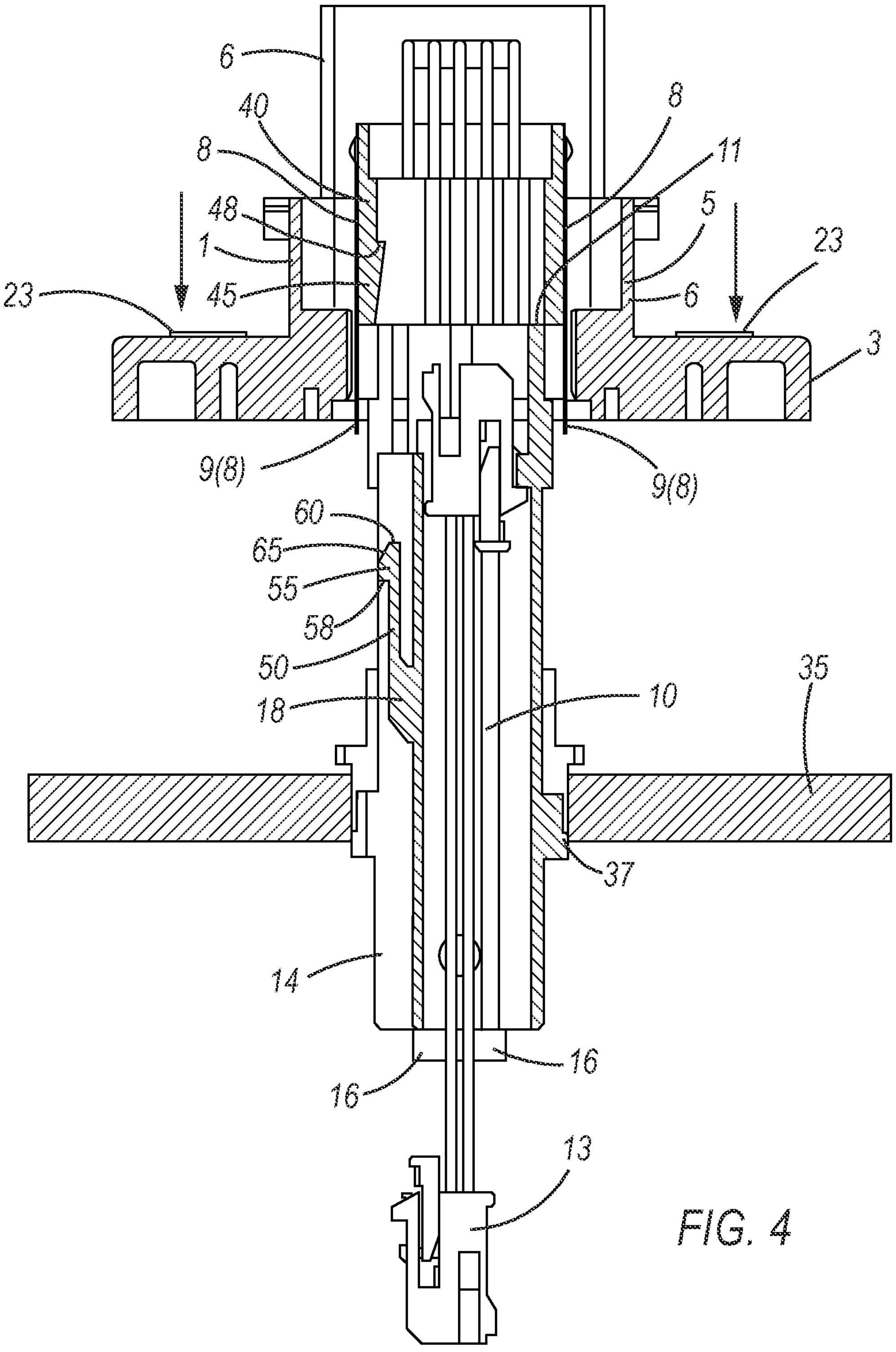
FIG. 4 is a cross-sectional elevational view showing the structural arrangement or manner in which the detachable header housing of this invention for the header connector assembly is ready to be attached, assembled, or mounted back onto the metal case and inner housing that in turn preferably remains connected to the electrical device.

As more particularly illustrated in FIG. 2B, the engaging portion 45 of the latch member 40 of the header housing 1 detachably or removably engages with the engaging portion 55 of the another latch member 50 of the inner housing 10. The latch member 40 is preferably and sturdily, resiliently, fixed to the outer shell 5 of header housing 1, and has a substantially flat extending portion 48. The another latch member 50 preferably extends from an extended portion 18 of the inner housing 10 (as shown in FIGS. 2B, 3, and 4) and at a distance away from the inner housing 10, which allows the another latch member 50 to be flexible or resilient, the engaging portion 55 of the another latch member 50 being movable so that a substantially flat extending portion 58 of the engaging portion 55 of the another latch member 50 flexibly or resiliently engages with the substantially flat extending portion 48 of the latch member 40 of the outer shell 5 of header housing 1. The engaging portion 55 of the another latch member 50 has an upper portion 60 with a downwardly and outwardly inclined upper surface 65.

When the engaging portion 45 of the latch member 40 and the engaging portion 55 of the another latch member 50 are engaged and locked to each other, as illustrated in FIG. 2B, the header housing 1, with the outer shell 5 and the metal shield member 8, becomes engaged and locked with the inner housing 10, while the inner housing 10 preferably remains connected to the electrical device 13. When it is desired for the engaging portion 45 of the latch member 40 to become disengaged from the engaging portion 55 of the another latch member 50, a device (e.g., a screwdriver, tool, or the like) is inserted into the outer shell 5 of header housing 1, and onto the downwardly and outwardly inclined upper surface 65 of the engaging portion 55 of the latch member 50, as shown in the arrow in FIG. 2B, to allow the substantially flat extending portion 58 of the engaging portion 55 of the flexible or resilient another latch member 50 to move away, unlock, or disengage from the substantially flat extending portion 48 of the engaging portion 45 of the latch member 40, which consequently disengages the engaging portion 55 away from the engaging portion 45, and subsequently allows the header housing 1, with the outer shell 5 and the metal shield member 8, to be unlocked, disassembled, detached, or removed from the inner housing 10, while the inner housing 10 preferably remains within the aperture 37 of the metal case 35, and connected to the associated electrical device 13.

The above-described unlocking, disassembling, removal or detachment of the header housing 1, with the outer shell 5 and the shield member 8, away from the inner housing 10, while the inner housing 10 preferably remains connected to the associated or corresponding electrical device 13, is desired when it is determined that the header housing 1, with the outer shell 5 and the shield member 8, of this invention, has been damaged, due to physical impact, intrusion of environmental contaminants, adverse external harms, or, being generally, unable to protect the inner housing 10 housed therein, or the like.

Upon the disengagement of the engaging portion 55 of the latch member 50 away from the engaging portion 45 of the latch member 40, the unsecured header housing 1 is, as illustrated in FIG. 3 (see arrows), unlocked, disassembled, detached or removed from the inner housing 10, while the inner housing 10 preferably remains connected to the associated electrical device 13. As also shown in FIG. 3, the outer shell 5 is lifted, and the base member 3 loses contact with the metal case 35 (as shown in the arrows in FIG. 3) and the header housing 1 is thus removed from the metal case 35. Thereafter, the header housing 1, with the outer shell 5 and the metal shield member 8, is serviced, repaired, or replaced with a new one by a user. Also, when replaced with a new one, the header housing 1, with the outer shell 5, will preferably have a new metal shield member 5 therein.

After the header housing 1, with the outer shell 5 and the metal shield member 8, is serviced, repaired, or replaced, the serviced, repaired, replaced or new header housing 1, also perhaps with a replaced or new metal shield member 8, is, as shown in FIG. 4, and installed back on the metal case 35 (see the arrows in FIG. 4) and mounted onto the inner housing 10, which preferably remains connected to the associated or corresponding electrical device 13. The serviced, repaired, replaced or new header housing 1 is pushed, in the direction, as shown in the arrows in FIG. 4, towards the top surface of the metal case 35. Thereupon, the header housing 1 will engage with the inner housing 10, the engaging portion 45 of the latch member 40 of the metal shield member 8 initially pushes inward the flexible or resilient engaging portion 55 of the latch member 55 of the inner housing 10, while continuing to move downward, whereupon the substantially flat extending member 48 of the engaging portion 45 of the latch member 40 engages with the substantially flat extending portion 58 of the engaging portion 55 of the flexible or resilient latch member 50 (see, also, FIG. 2B), and preferably, a clicking sound is heard, which signifies that the latch members 40, 50 have fully locked or engaged. Upon the engagement of the latch members 40, 50, the serviced, repaired, replaced, or new header housing 1 is effectively secured, mounted, and locked with the inner housing 10 of the inner housing 10, as shown in FIG. 5.

Figure 5:
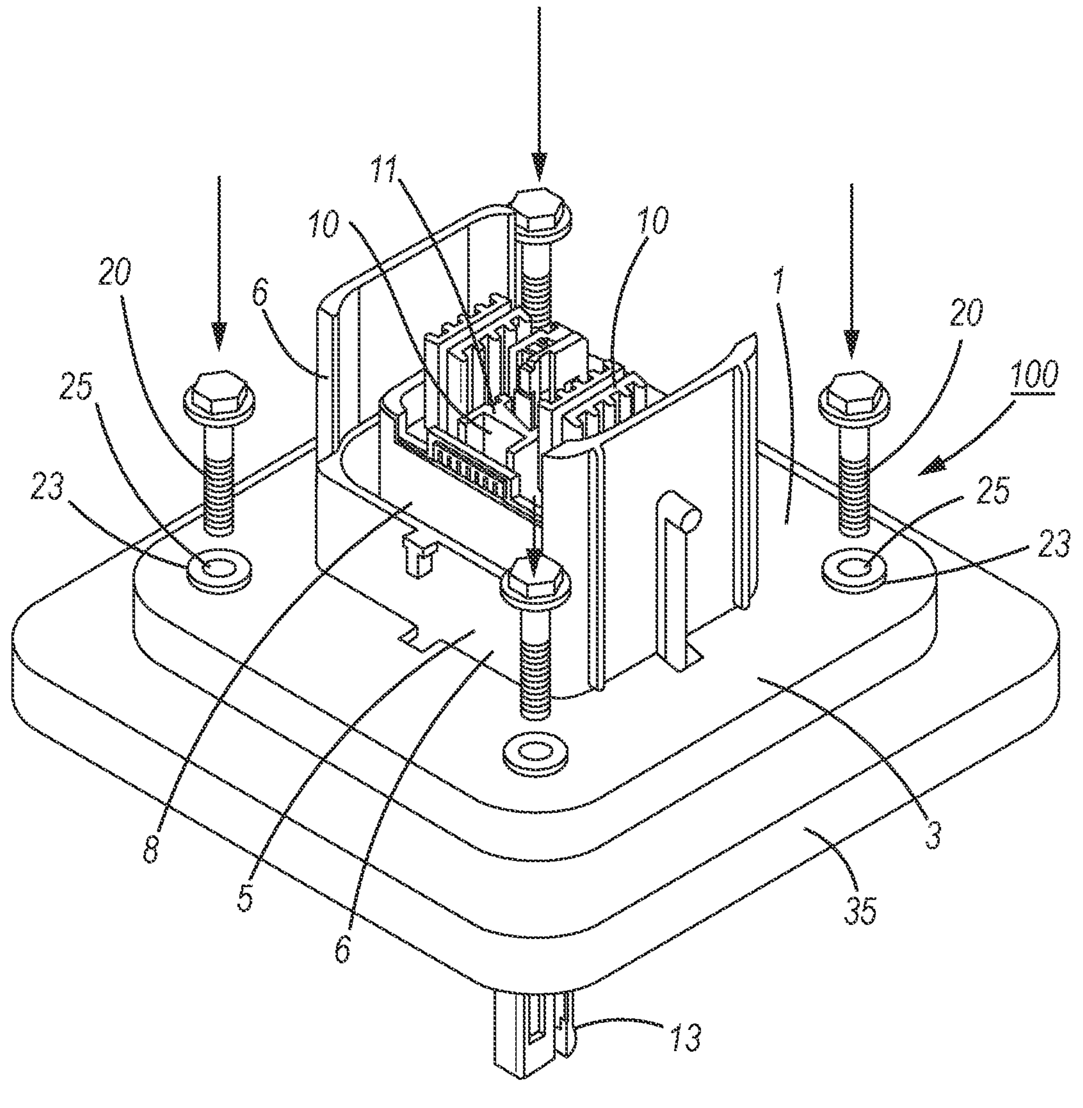
FIG. 5 is a perspective view showing the detachable header housing of this invention for the header connector assembly being attached, assembled, or mounted back onto the metal case and inner housing that in turn preferably remains connected to the electrical device.

In FIG. 5, upon the return or mounting back of the serviced, repaired, replaced or new header housing 1 onto the top of the metal case 35, the bolts 20 are then inserted into respective ones of the metallic compression limiters 23; and thereupon, the bolts 20 are respectively screwed or securely attached into the metal case 35. This takes place while the inner housing 10 remains locked with the header housing 1 and remains connected to the associated or corresponding electrical device 13.

Figure 8:
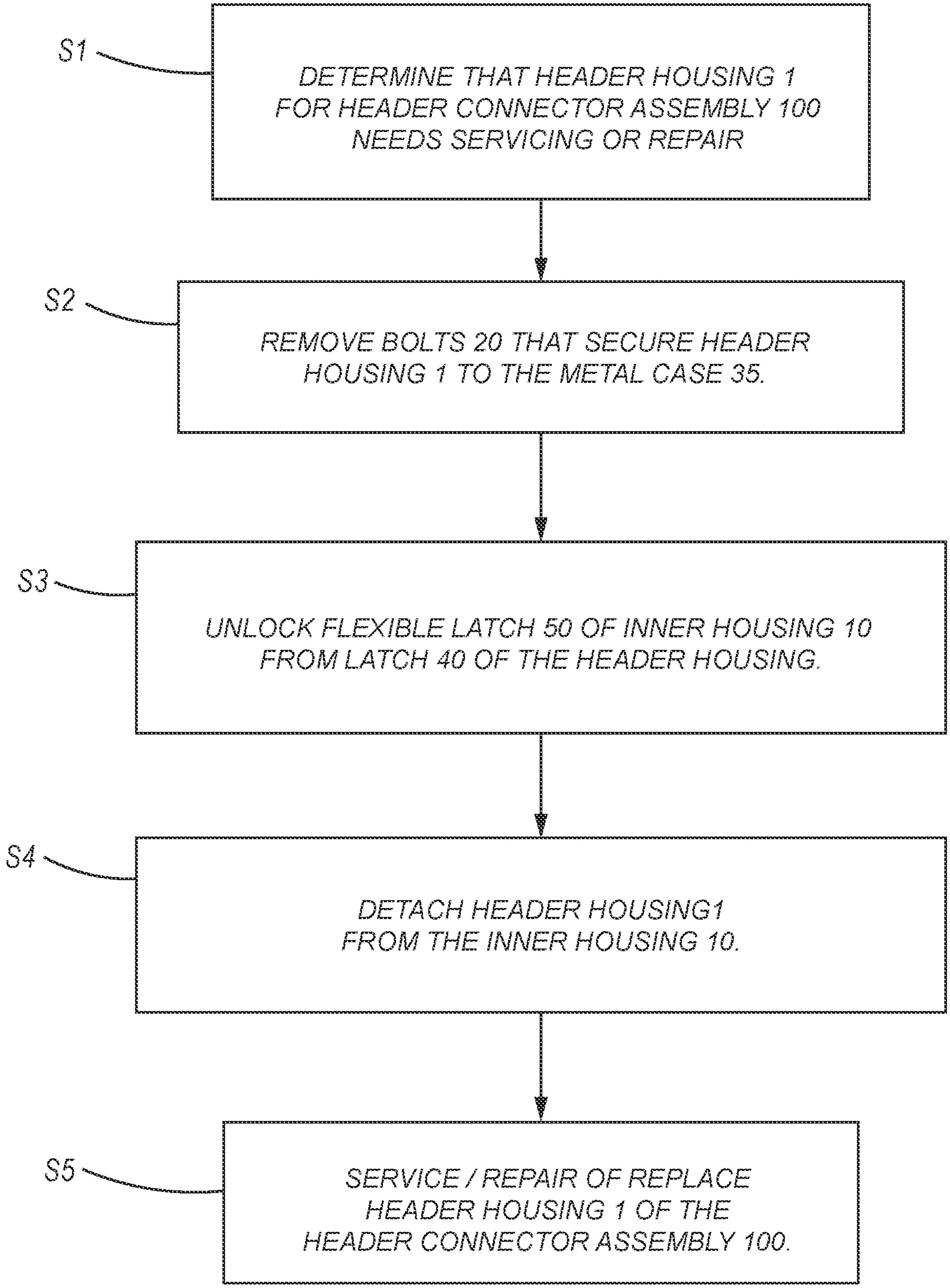
FIG. 8 is a flowchart showing the steps for detaching, disassembling, or removing the detachable header housing of this invention for the metal case and inner housing that in turn preferably remains connected to the electrical device.

The method, in this invention, for detaching the header housing 1 is shown in FIG. 8, wherein, in Step S1, the user determines that the outer shell 1 of the inner housing 10 requires servicing or repair. In Step S2, the bolts 20 that attach the header housing 1 to the metal case 35 are unscrewed/loosened, and removed (see, also, FIG. 1). Next, the flexible or resilient latch 50 of the inner housing 10 is, in Step S3, unlocked from the latch 40 the header housing 1 (see, also, FIGS. 2A and 2B). Thereafter, in Step S4, once the flexible latch 50 of the inner housing 10 is unlatched or disconnected from the latch 40 of the header housing 1, the header housing 1 is detached or removed from the inner housing 10 (see, also, FIG. 3). The header housing 1, with the outer shell 5 and the metal shield member 8, is then serviced, repaired, or replaced in Step S5.

It is preferable that the above-described steps, Steps S1 through S5 (shown in FIG. 8), take place or occur, while the inner housing 10 remains connected to the associated electrical component 13.

Figure 9:
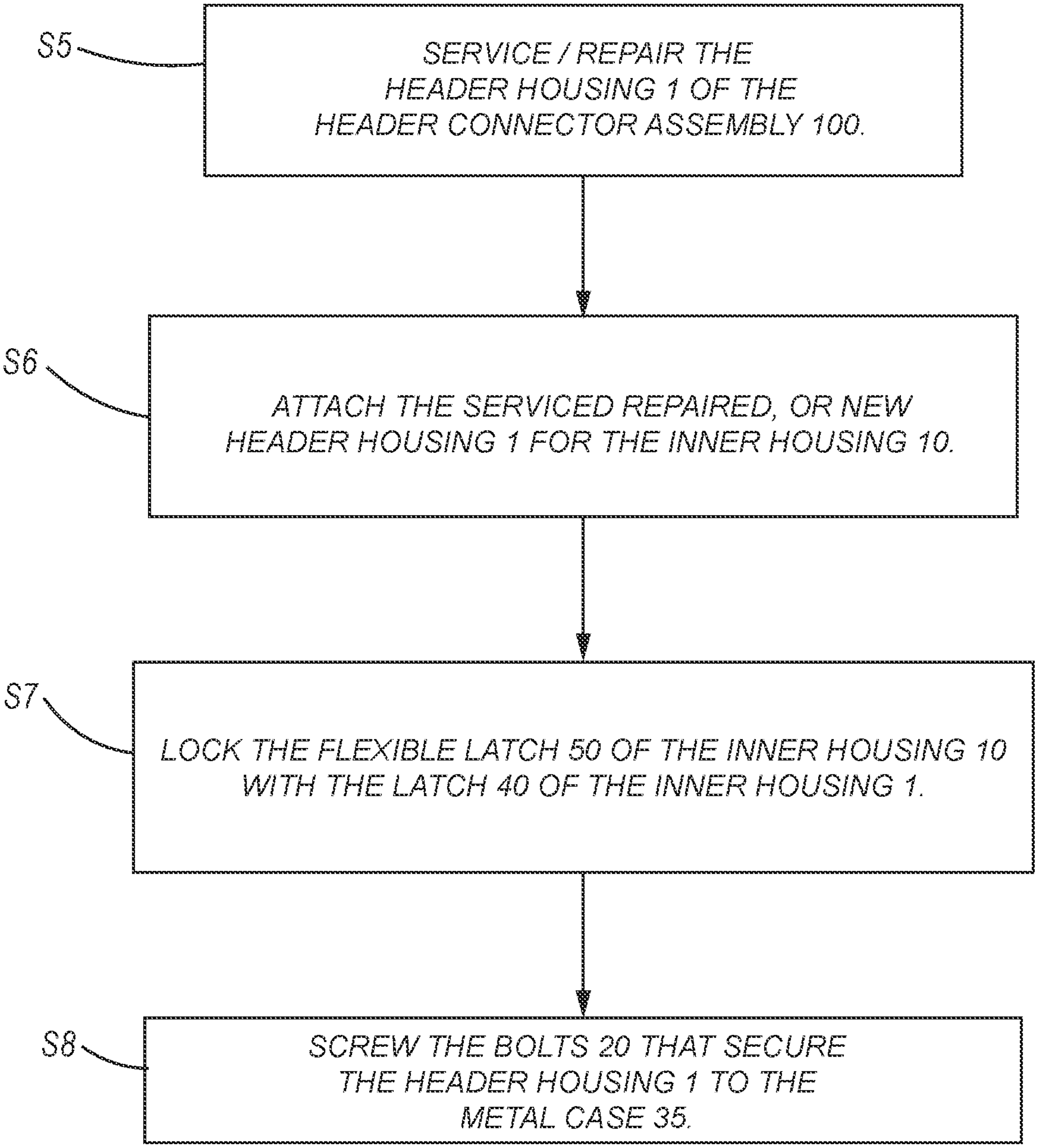
FIG. 9 is a flowchart showing the steps for attaching, assembling, or mounting back the detachable header housing of this invention for the header connector assembly onto the metal case and inner housing that in turn preferably remains connected to the electrical device.

Once the header housing 1 has been serviced, repaired, or replaced in Step S5, FIG. 9 shows the method, in this invention, for assembling the header housing 1 onto the inner housing 10 and metal case 35. The serviced, repaired, replaced or new header housing 1 is engaged or attached to the inner housing 10, in Step S6 (see, also, FIG. 4). In Step S7, the flexible latch 50 of the inner housing 10 is locked or latched with the latch 40 of the header housing 1, and the header housing 1 is effectively locked with the inner housing 10. Thereafter, in Step S8, the bolts 20 are placed into the respective ones of the metallic compression limiters 23, and tightened or secured into the metal case 35 so as to subsequently securely attach or mount the header housing 1 and its base member 3 to the metal case 35.

As in the above-described steps (S1 through S5) in FIG. 8, it is preferable that the above-described steps, Steps S5 through S8 (shown in FIG. 9), also take place or occur, while the inner housing 10 remains connected to the associated or corresponding electrical component 13.

The present invention is not limited to the above-described embodiments; and various modifications in design, structural arrangements or the like may be used without departing from the scope or equivalents of the present invention.

I claim:

1. A detachable header housing for a header connector assembly, comprising an outer shell with a shield member, wherein the header housing with a shield member is detachably assembled, attached, or mounted onto an inner housing, wherein when the header housing is detachably assembled, attached, or mounted onto the inner housing, the header housing is one of being locked and unlocked onto the inner housing, the header housing having a first latch member with a first engaging portion, wherein the inner housing is located within the header housing when the header housing is attached onto the inner housing, the inner housing having a second latch member with a second engaging portion, wherein the first engaging portion of the first latch member of the header housing detachably or removably engages with the second engaging portion of the second latch member of the inner housing, and wherein the inner housing remains connected to an electrical device.

2. The detachable header housing for the header connector assembly according to claim 1, wherein the inner housing is attached to a main body containing at least one of a set of terminals, a power assembly, and a high voltage interlock loop (HVIL) assembly.

3. The detachable header housing for the header connector assembly according to claim 1, wherein the inner housing is connected to an electrical device.

4. The detachable header housing for the header connector assembly according to claim 1, wherein the inner housing holds at least one metal contact or pin.

5. The detachable header housing for the header connector assembly according to claim 1, wherein the header housing, when requiring service, repair or replacement, is detachable or removable from the inner housing, while maintaining the connection of the inner housing to the electrical device.

6. The detachable header housing for the header connector assembly according to claim 5, wherein the header housing, after having been serviced, repaired or replaced, is attachable, or capable of being assembled or mounted back onto the inner housing, while maintaining the connection of the header connector assembly to the electrical device.

7. The detachable header housing for the header connector assembly according to claim 1, wherein the header housing with the shield member, shields or seals the inner housing from electromagnetic interference (EMI), external damage, either due to physical impact or environmental contaminants.

8. The detachable header housing for the header connector assembly according to claim 1, wherein the header housing with the shield member prevents damage to the inner housing during transport or other function thereof from physical impact or environmental contaminants.

9. A method for detaching a header housing for a header connector assembly, comprising the steps of:

detaching or removing a header housing with a shield member from a metal case, said header housing having a first latch member with a first engaging portion;

unlocking and thereafter removing said header housing with said shield member from an inner housing of said header connector assembly, said inner housing located within said header housing, said inner housing having a second latch member with a second engaging portion, wherein said step of unlocking includes the step of detachably or removably engaging said first latch member of said first engaging portion with said second latch member of said second engaging portion; and maintaining connection of said inner housing to an associated or corresponding electrical device.

10. The method for detaching said header housing of said header connector assembly according to claim 9, wherein said step of detaching or removing said header housing with said shield member from said metal case includes a step of unscrewing at least a bolt joining said header housing and said metal case when said header housing with said shield member requires service, repair or repair, while maintaining said connection of said inner housing to said associated or corresponding electrical device.

11. The method for detaching said header housing from said inner housing according to claim 10, wherein said step of unlocking or removing said header housing from said inner housing of said header connector assembly includes a step of unlatching a latch member of said inner housing of said header connector assembly from another latch member of said header housing, while maintaining said connection of said inner housing to said associated electrical device.

12. The method for detaching said header housing from said inner housing according to claim 11, wherein said step of unlatching said latch member of said inner housing of said header connector assembly from said another latch member of said header housing includes a step of depressing or unlocking said latch member of said inner housing of said header connector assembly from said another latch member of said header housing, while maintaining said connection of said inner housing to said associated or corresponding electrical device.

13. The method for detaching said header housing from said header connector assembly according to claim 12, wherein said step of depressing or unlocking said latch member of said inner housing from said another latch member of said header housing includes a step of dislodging, with the use of a tool, said latch member of said inner housing of said header connector assembly from said another latch member of said header housing, while maintaining said connection of said inner housing to said associated or corresponding electrical device.

14. A method for attaching a detachable header housing for a header connector assembly, comprising the steps of:

attaching a header housing with said shield member onto a metal case;

lockably assembling or locking said header housing with said shield member onto an inner housing of said header connector assembly, said inner housing located within said header housing, said header housing having a first latch member with a first engaging portion, and said inner housing having a second latch member and a second engaging portion, wherein said step of lockably assembling or locking includes the step of detachably or removably engaging said first latch member of said first engaging portion with said second latch member of said second engaging portion; and maintaining connection of said inner housing to an associated or corresponding electrical device.

15. The method for attaching said header housing for said header connector assembly according to claim 14, wherein said step of attaching said header housing with said shield member onto said metal case includes a step of connecting a latch member of said inner housing with another latch member of said header housing, while maintaining said connection of said inner housing to said associated or corresponding electrical device.

16. The method for attaching said header housing for said header connector assembly according to claim 15, wherein said step of attaching a header housing with said shield member onto a metal case includes a step of screwing at least a bolt for joining said header housing with said metal case, while maintaining said connection of said inner housing to said associated or corresponding electrical device.

17. The method for attaching said header housing for said header connector assembly according to claim 16, wherein said step of assembling or mounting said header housing with said shield member onto an inner housing of said header connector assembly includes a step of assembling or mounting a serviced, repaired, replaced, or new header housing with said shield member onto said inner housing of said header connector assembly, while maintaining said connection of said inner housing to said associated or corresponding electrical device.

18. The method for attaching said header housing for said header connector assembly according to claim 15, wherein said step of attaching said header housing with said shield member onto a metal case, includes a step of attaching a serviced, repaired, replaced or new header housing with said shield member onto said metal case, while maintaining said connection of said inner housing to said associated or corresponding electrical device.

* * * * *